(12) United States Patent
Imoto et al.

(10) Patent No.: US 10,180,718 B2
(45) Date of Patent: Jan. 15, 2019

(54) INFORMATION PROCESSING APPARATUS AND INFORMATION PROCESSING METHOD

(71) Applicant: SONY CORPORATION, Tokyo (JP)

(72) Inventors: Maki Imoto, Tokyo (JP); Takuro Noda, Tokyo (JP); Ryouhei Yasuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/914,572

(22) Filed: Mar. 7, 2018

(65) Prior Publication Data

US 2018/0196513 A1 Jul. 12, 2018

Related U.S. Application Data

(63) Continuation of application No. 14/915,637, filed as application No. PCT/JP2014/003921 on Jul. 24, 2014, now Pat. No. 9,939,894.

(30) Foreign Application Priority Data

Sep. 2, 2013 (JP) ................................ 2013-181228

(51) Int. Cl.
*G06G 5/00* (2006.01)
*G06F 3/01* (2006.01)
(Continued)

(52) U.S. Cl.
CPC ............ *G06F 3/013* (2013.01); *G06F 3/0487* (2013.01); *G06F 3/04842* (2013.01); *G06F 3/04845* (2013.01)

(58) Field of Classification Search
CPC ...... G06F 3/013; G06F 3/0484; G06F 3/0487; G06F 3/04842; G06F 3/04845
See application file for complete search history.

(56) References Cited

U.S. PATENT DOCUMENTS

5,367,315 A * 11/1994 Pan ..................... G06F 3/013
345/156
5,481,622 A * 1/1996 Gerhardt ................ A61B 3/113
345/158

(Continued)

FOREIGN PATENT DOCUMENTS

JP 04-372012 A 12/1992
JP 06-051901 A 2/1994
(Continued)

OTHER PUBLICATIONS

Office Action for JP Patent Application No. 2013-181228, dated Oct. 18, 2016, 5 pages of Office Action and 6 pages of English Translation.

(Continued)

*Primary Examiner* — Vijay Shankar
(74) *Attorney, Agent, or Firm* — Chip Law Group

(57) ABSTRACT

There is provided an information processing apparatus including a circuitry configured to control a state of a selection candidate object, when a predetermined condition concerning a selection of the selection candidate object is determined to be satisfied based on a relation between a display position of the selection candidate object and a position towards which the user gazes or a gazing direction, by bringing the selection candidate object to a selected state.

17 Claims, 4 Drawing Sheets

(51) Int. Cl.
G06F 3/0484 (2013.01)
G06F 3/0487 (2013.01)

(56) References Cited

U.S. PATENT DOCUMENTS

| | | | |
|---|---|---|---|
| 5,565,888 A * | 10/1996 | Selker | G06F 3/04842 345/157 |
| 5,689,619 A | 11/1997 | Smyth | |
| 2012/0293406 A1 | 11/2012 | Park et al. | |
| 2013/0176208 A1 * | 7/2013 | Tanaka | G06F 3/013 345/156 |

FOREIGN PATENT DOCUMENTS

| | | |
|---|---|---|
| JP | 09-054239 A | 2/1997 |
| JP | 10-187334 A | 7/1998 |
| JP | 2002-301030 A | 10/2002 |
| JP | 2002-345756 A | 12/2002 |
| JP | 2003-280805 A | 10/2003 |
| JP | 2005-352619 A | 12/2005 |
| JP | 2009-064395 A | 3/2009 |
| JP | 2013140540 A | 7/2013 |
| WO | 2009/093435 A1 | 7/2009 |

OTHER PUBLICATIONS

Notice of Allowance for U.S. Appl. No. 14/915,637, dated Nov. 28, 2017, 8 pages.
Non-Final Office Action for U.S. Appl. No. 14/915,637, dated Jun. 14, 2017, 10 pages.
International Search Report and Written Opinion of PCT Application No. PCT/JP2014/003921, dated Oct. 15, 2014, 07 pages.
International Preliminary Report on Patentability of PCT Application No. PCT/JP2014/003921, dated Mar. 17, 2016, 06 pages of IPRP.
Office Action for CN Patent Application No. 201480046755.3, dated Apr. 23, 2018, 07 pages of Office Action and 09 pages of English Translation.

* cited by examiner

INFORMATION PROCESSING APPARATUS AND INFORMATION PROCESSING METHOD

CROSS REFERENCE TO RELATED APPLICATIONS

This application is a continuation application of U.S. patent application Ser. No. 14/915,637, filed Feb. 29, 2016, which is a national stage entry of PCT application PCT/JP2014/003921 filed Jul. 24, 2014 and which claims the benefit of Japanese Priority Patent Application JP 2013-181228 filed Sep. 2, 2013, the entire contents of which are incorporated herein by reference.

TECHNICAL FIELD

The present disclosure relates to an information processing apparatus, an information processing method, and a program.

BACKGROUND ART

In recent years, user interfaces allowing a user to operate through the line of sight by using line-of-sight detection technology such as an eye tracking technology are emerging. For example, the technology described in PTL 1 below can be cited as a technology concerning the user interface allowing the user to operate through the line of sight.

CITATION LIST

Patent Literature

PTL 1
JP 2009-64395A

SUMMARY

Technical Problem

When, for example, the user operates through the line of sight and moves an object such as a cursor through the line of sight, even if the user attempts to arrange the object in a desired position on the display screen, the object may be moved by being influenced by the movement of eyes. When, as described above, the object is moved by being influenced by the movement of eyes, it is difficult to arrange the object in the desired position and thus, the convenience of the user may be degraded.

The present disclosure proposes a novel and improved information processing apparatus capable of enhancing the convenience of the user when the user operates an object displayed on the display screen through the movement of the line of sight, an information processing method, and a program.

Solution to Problem

According to an embodiment of the present disclosure, there is provided an information processing apparatus including a circuitry configured to control a state of a selection candidate object, when a predetermined condition concerning a selection of the selection candidate object is determined to be satisfied based on a relation between a display position of the selection candidate object and a position towards which the user gazes or a gazing direction, by bringing the selection candidate object to a selected state.

According to an embodiment of the present disclosure, there is provided an information processing method executed by an information processing apparatus, the method including determining whether a predetermined condition concerning a selection of a selection candidate object is satisfied based on a relation between a display position of the selection candidate object and a position towards which a user gazes or a gazing direction, and when the predetermined condition concerning the selection is determined to be satisfied, bringing the selection candidate object to a selected state.

According to an embodiment of the present disclosure, there is provided anon-transitory computer-readable medium having embodied thereon a program, which when executed by a computer causes the computer to perform a method, the method including determining whether a predetermined condition concerning a selection of a selection candidate object is satisfied based on a relation between a display position of the selection candidate object and a position toward which a user gazes or a gazing direction, and when the predetermined condition concerning the selection is determined to be satisfied, bringing the selection candidate object to a selected state.

Advantageous Effects of Invention

According to the present disclosure, the convenience of the user when the user operates an object displayed on the display screen through the movement of the line of sight can be enhanced.

The above effect is not necessarily restrictive and together with the above effect or instead of the above effect, one of the effects shown in this specification or another effect grasped from this specification may be achieved.

DESCRIPTION OF EMBODIMENTS

Figure 1:
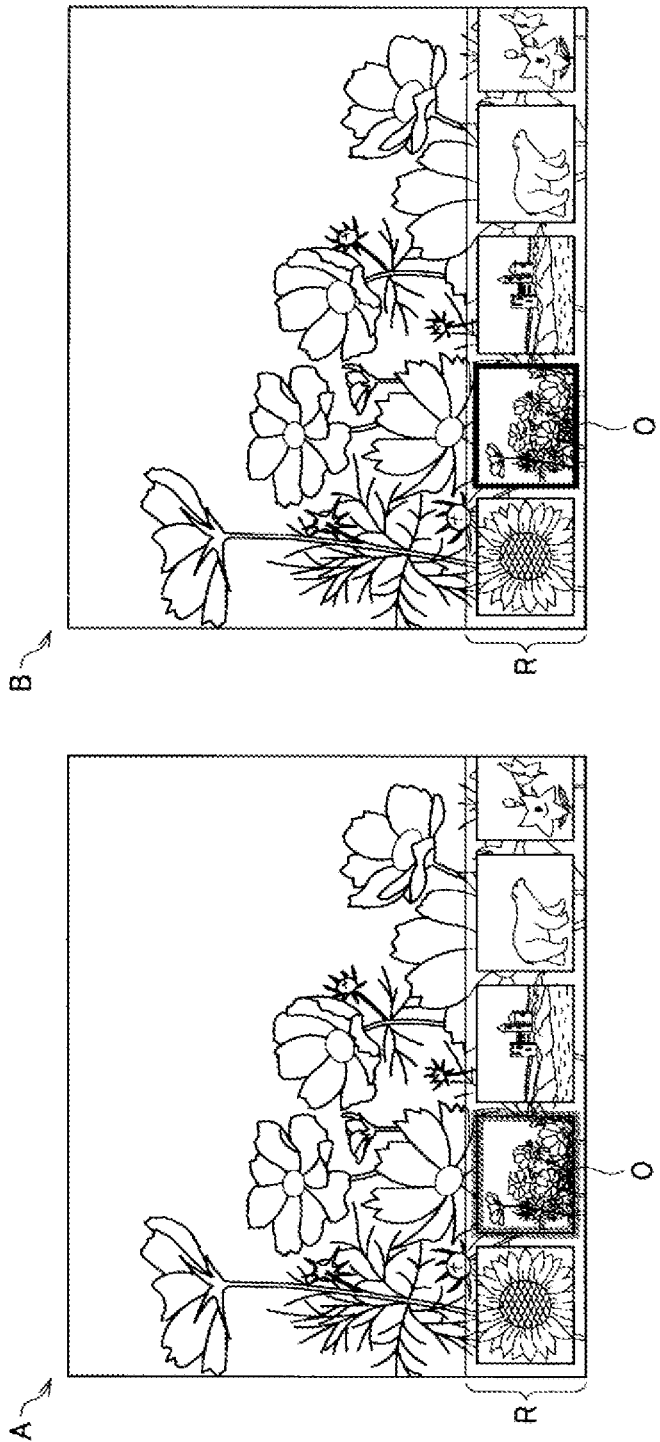
FIG. 1 is an explanatory view illustrating an example of processing according to an information processing method according to an embodiment.

Embodiments of the present disclosure will be described in detail below with reference to the appended drawings. Note that in this specification and the drawings, the same reference signs are attached to elements having substantially the same function and configuration, thereby omitting duplicate descriptions.

The description will be provided in the order shown below:
1. Information Processing Method According to an Embodiment
2. Information Processing Apparatus According to an Embodiment
3. Program According to an Embodiment (Information Processing Method According to an Embodiment)

Before describing the configuration of an information processing apparatus according to an embodiment, an information processing method according to an embodiment will first be described. The information processing method according to an embodiment will be described by taking a case in which processing according to the information processing method according to an embodiment is performed by an information processing apparatus according to an embodiment as an example.

1. Overview of Processing According to the Information Processing Method According to an Embodiment As described above, when, for example, the user operates through the line of sight and moves an object such as a cursor through the line of sight, even if the user attempts to arrange the object in a desired position on the display screen, the object may be moved by being influenced by the movement of eyes. When, as described above, the object is moved by being influenced by the movement of eyes, it is difficult to arrange the object in the desired position and thus, the convenience of the user may be degraded.

Thus, the information processing apparatus according to an embodiment brings an object displayed in a position of the line of sight of the user on the display screen to a selected state based on the movement of the line of sight of the user (movement based on changes of the position of the line of sight of the user on the display screen).

Objects according to an embodiment include various objects displayed on the display screen, for example, an icon, a cursor, thumbnail images (moving images or still images), a message box, and a character string or image to make a notification to the user (hereinafter, presented as a "notification object").

Objects according to an embodiment include, for example, objects that are not intended for operation by the line of sight of the user and objects that are intended for operation by the line of sight of the user.

Objects intended for operation by the line of sight of the user according to an embodiment include, for example, objects shown in (a) and (b) below:

(a) Objects directly operated by the movement of the line of sight of the user
(b) Objects indirectly operated by the above directly operated object The object directly operated according to an embodiment is, for example, an object (hereinafter, presented as a "moving object") whose position displayed on the display screen moves in accordance with the position of the line of sight of the user indicated by information (described later) about eyes of the user. Moving objects according to an embodiment include various objects that can become targets whose displayed position changes in accordance with the position of the line of sight of the user, for example, an icon, a cursor, a message box, and a notification object.

The object indirectly operated according to an embodiment is, for example, an object brought to a selected state by the directly operated object. For example, an object (hereinafter, presented as a "static object") whose position displayed on the display screen does not move in accordance with the position of the line of sight of the user indicated by information (described later) about eyes of the user can be cited as an object indirectly operated according to an embodiment. More specifically, objects indirectly operated according to an embodiment include various objects that can become targets brought to a selected state by the directly operated object, for example, thumbnail images, a message box, a notification object and the like that are displayed in a predetermined position of the display screen.

From the viewpoint of being brought to a selected state by the information processing apparatus according to an embodiment, objects directly operated according to an embodiment and objects indirectly operated according to an embodiment can become target objects (hereinafter, presented as "selection candidate objects") that can be brought to a selected state based on the movement of the line of sight of the user.

The selected state according to an embodiment is a state that is not dependent on the movement of the line of sight of the user, for example, a state that does not move in accordance with the movement of the line of sight of the user. That is, an object brought to a selected state by the information processing apparatus according to an embodiment is not affected by the movement of the line of sight of the user even if the line of sight of the user should move after the object being brought to a selected.

Thus, the occurrence of a situation that can cause degradation of the convenience of the user, for example, a state in which "an object attempted to be arranged in a desired position is moved by being influenced by the movement of eyes" can be prevented by an object displayed on the display screen being brought to a selected state based on the movement of the line of sight of the user by the information processing apparatus according to an embodiment as processing according to an information processing method according to an embodiment.

Therefore, the information processing apparatus according to an embodiment can enhance the convenience of the user when the user operates an object displayed on the display screen by the movement of the line of sight by bringing the object displayed on the display screen to a selected state based on the movement of the line of sight of the user.

2. Processing According to the Information Processing Method According to an Embodiment More specifically, the information processing apparatus according to an embodiment enhances the convenience of the user by performing, for example, (1) Determination processing and (2) Display control processing shown below as processing according to an information processing method according to an embodiment.

(1) Determination Processing

An information processing apparatus according to an embodiment determines whether predetermined conditions concerning the selection of object are satisfied based on information about eyes of the user.

The information about eyes of the user according to an embodiment is data (or a data group) containing information about the position of the line of sight of the user on the display screen.

The display screen according to an embodiment is, for example, a target display screen to which the user directs his (her) line of sight to perform various operations thereon by the movement of eyes. As the display screen according to an embodiment, for example, the display screen of a display unit (not shown) included in the information processing apparatus according to an embodiment and the display screen of an external display apparatus (or an external display device) connected to the information processing apparatus according to an embodiment wirelessly or via a cable can be cited.

The information about the position of the line of sight of the user according to an embodiment is, for example, data showing the position of the line of sight of the user or data that can be used to identify the position of the line of sight of the user (or data that can be used to estimate the position of the line of sight of the user. This also applies below).

As the data showing the position of the line of sight of the user according to an embodiment, for example, coordinate data showing the position of the line of sight of the user on the display screen can be cited. The position of the line of sight of the user on the display screen is represented by, for example, coordinates in a coordinate system in which a reference position of the display screen is set as its origin.

As the data that can be used to identify the position of the line of sight of the user according to an embodiment, for example, captured image data in which the direction in which images (moving images or still images) are displayed on the display screen is imaged can be cited. The data that can be used to identify the position of the line of sight of the user according to an embodiment may further include detection data of any sensor obtaining detection values that can be used to improve estimation accuracy of the position of the line of sight of the user such as detection data of an infrared sensor that detects infrared radiation in the direction in which images are displayed on the display screen.

When coordinate data indicating the position of the line of sight of the user on the display screen is used as information about the position of the line of sight of the user according to an embodiment, the information processing apparatus according to an embodiment identifies the position of the line of sight of the user on the display screen by using, for example, coordinate data acquired from an external apparatus having identified (estimated) the position of the line of sight of the user by using the line-of-sight detection technology and indicating the position of the line of sight of the user on the display screen.

It is possible to identify the position of the line of sight of the user on the display screen by using the line of sight detected by using the line-of-sight detection technology and the position of the user and the orientation of face with respect to the display screen detected from a captured image in which the direction in which images are displayed on the display screen is captured. However, the method of identifying the position of the line of sight of the user on the display screen according to an embodiment is not limited to the above method. For example, the information processing apparatus according to an embodiment and the external apparatus can use any technology capable of identifying the position of the line of sight of the user on the display screen.

As the line-of-sight detection technology according to an embodiment, for example, a method of detecting the line of sight based on the position of a moving point (for example, a point corresponding to a moving portion in an eye such as the iris and the pupil) of an eye with respect to a reference point (for example, a point corresponding to a portion that does not move in the eye such as an eye's inner corner or corneal reflex) of the eye can be cited. However, the line-of-sight detection technology according to an embodiment is not limited to the above technology and may be, for example, any line-of-sight detection technology capable of detecting the line of sight.

When data that can be used to identify the position of the line of sight of the user is used as information about the position of the line of sight of the user according to an embodiment, the information processing apparatus according to an embodiment uses, for example, captured image data (example of data that can be used to identify the position of the line of sight of the user) acquired by an imaging unit (described later) included in the local apparatus (information processing apparatus according to an embodiment. This also applies below) or an external imaging device. In the above case, the information processing apparatus according to an embodiment may use, for example, detection data (example of data that can be used to identify the position of the line of sight of the user) acquired from a sensor that can be used to improve estimation accuracy of the position of the line of sight of the user included in the local apparatus or an external sensor. The information processing apparatus according to an embodiment performs processing according to an identification method of the position of the line of sight of the user on the display screen according to an embodiment using, for example, data that can be used to identify the position of the line of sight of the user acquired as described above to identify the position of the line of sight of the user on the display screen.

However, data contained in information about eyes of the user according to an embodiment is not limited to information about the position of the line of sight of the user on the display screen.

For example, information about eyes of the user according to an embodiment may contain information about the motion of eyes of the user.

The information about the motion of eyes of the user according to an embodiment is, for example, data indicating the motion of eyes of the user, data that can be used to identify the motion of eyes of the user (or data that can be used to estimate the motion of eyes of the user. This also applies below).

As the data indicating the motion of eyes of the user according to an embodiment, for example, data indicating a predetermined motion of the eye (for example, data showing the corresponding number of a predetermined motion) such as one blinking motion, a plurality of continuous blinking motions, and a winking motion can be cited. As the data that can be used to identify the motion of eyes of the user according to an embodiment, for example, captured image data in which the direction in which images (moving images or still images) are displayed on the display screen can be cited. When information about eyes of the user according to an embodiment is the captured image data, the information about eyes of the user according to an embodiment can play the role of information about the position of the line of sight of the user according to an embodiment.

When data showing the motion of eyes of the user is used as information about the motion of eyes of the user according to an embodiment, the information processing apparatus according to an embodiment determines that a predetermined motion of eye has been performed by using, for example, data acquired from an external apparatus that has identified (estimated) the motion of eyes of the user and showing the motion of eyes of the user.

It is possible to determine that a predetermined motion of eyes has been performed when, for example, changes of the shape of eyes detected from moving images (or a plurality of still images) in which the direction in which images are displayed on the display screen is imaged matches changes of the shape of eyes corresponding to the predetermined motion of eyes. However, the method of determining the predetermined motion of eyes according to an embodiment is not limited to the above method. For example, the information processing apparatus according to an embodiment or the external apparatus can be used any technology capable of determining that a predetermined motion of eyes is performed.

When data that can be used to identify the motion of eyes of the user is used as information about the position of the line of sight of the user according to an embodiment, the information processing apparatus according to an embodiment uses, for example, captured image data (example of data that can be used to identify the motion of eyes of the user) acquired by an imaging unit (described later) included in the local apparatus or an external imaging device. The information processing apparatus according to an embodiment performs processing according to a determination method of a predetermined motion of eyes according to an embodiment using, for example, data that can be used to identify the motion of eyes of the user acquired as described above to determine that the predetermined motion of eyes is performed.

The determination processing according to an embodiment will be described more concretely below.

(1-1) First Example of the Determination Processing: When the Predetermined Condition Concerning the Selection of an Object is a Condition Concerning the Time When the predetermined condition concerning the selection is a condition concerning the time, the information processing apparatus according to an embodiment determines whether the predetermined condition concerning the selection of an object is satisfied based on the time obtained based on information about eyes of the user.

More specifically, the information processing apparatus according to an embodiment determines that the predetermined condition concerning the selection is satisfied if, for example, the time in which the position of the line of sight indicated by the information about eyes of the user is inside a region (hereinafter, presented as a "first region") of the display screen in which a selection candidate object is displayed is longer than a set first setting time. The information processing apparatus according to an embodiment may also determine that the predetermined condition concerning the selection is satisfied if, for example, the time in which the position of the line of sight indicated by the information about eyes of the user is inside the first region is equal to the first setting time or longer.

When the selection candidate object according to an embodiment is a static object (object whose position displayed on the display screen does not move in accordance with the position of the line of sight of the user) according to an embodiment, the information processing apparatus according to an embodiment determines whether the predetermined condition concerning the selection is satisfied by using, for example, the first region corresponding to a static region.

When the selection candidate object according to an embodiment is a moving object (object whose position displayed on the display screen moves in accordance with the position of the line of sight of the user) according to an embodiment, the information processing apparatus according to an embodiment sets the first region (or resets the first region. This also applies below) in accordance with, for example, a moving state of the moving object. Then, the information processing apparatus according to an embodiment determines whether the predetermined condition concerning the selection is satisfied by using, for example, the first region set for the moving object.

The information processing apparatus according to an embodiment set the first region if, for example, the moving distance of the moving object in a set predetermined time (however, the predetermined time<first setting time) is equal to a set threshold or less (or less than the threshold). However, it is needless to say that the method of setting the first region when the selection candidate object according to an embodiment is a moving object is not limited to the above method.

As the first setting time according to an embodiment, for example, a preset time based on an operation of the manufacturer of the information processing apparatus according to an embodiment or the user can be cited. When the first setting time according to an embodiment is a preset time, the information processing apparatus according to an embodiment determines whether the predetermined condition concerning the selection is satisfied based on the time in which the position of the line of sight indicated by information about eyes of the user is within the first region and the preset first setting time.

However, the first setting time according to an embodiment is not limited to a preset time.

For example, the information processing apparatus according to an embodiment can dynamically set the first setting time based on the size of movement of eyes of the user based on changes of the position of the line of sight indicated by information about eyes of the user and determine whether the predetermined condition concerning the selection is satisfied based on the dynamically set first setting time.

When, for example, the user desires that some selection candidate object be brought to a selected state, the movement of eyes of the user frequently is limited to a smaller range because the user observes the selection candidate object closely or the like. Thus, the information processing apparatus according to an embodiment grasps the region containing positions of the line of sight indicated by information about eyes of the user that have changed in a set predetermined time as the size of movement of eyes of the user and sets the first setting time corresponding to the size of movement of eyes of the user.

More specifically, the information processing apparatus according to an embodiment, for example, identifies the region containing positions of the line of sight indicated by information about eyes of the user that have changed in a set predetermined time and calculates the area of the identified region. Then, the information processing apparatus according to an embodiment sets the first setting time corresponding to the area of the identified region, that is, the first setting time corresponding to the size of movement of eyes of the user based on, for example, a table (or a database) in which the area of region and the first setting time are associated and the area of the identified region.

However, the method of dynamically setting the first setting time based on information about eyes of the user according to an embodiment is not limited to the above method. For example, the information processing apparatus according to an embodiment may calculate an absolute value of a vector showing changes of the position of the line of sight indicated by information about eyes of the user to set the first setting time corresponding to the maximum value of the absolute value in a set predetermined time. The information processing apparatus according to an embodiment can also use any method capable of dynamically setting the first setting time based on information about eyes of the user.

(1-2) Second Example of the Determination Processing: When the Predetermined Condition Concerning the Selection of an Object is a Condition Concerning the Shape of Eyes of the User As described above, information about eyes of the user according to an embodiment may contain information about the motion of eyes of the user. Also, as described above, the information processing apparatus according to an embodiment can determine whether a predetermined motion of eyes is performed by using information about the motion of eyes of the user (for example, data showing the motion of eyes of the user or data that can be used to identify the motion of eyes of the user).

When the predetermined condition concerning the selection is a condition concerning the shape of eyes of the user, the information processing apparatus according to an embodiment determines whether the predetermined condition concerning the selection of an object is satisfied based on the motion of eyes determined based on information about the motion of eyes of the user contained in information about eyes of the user.

More specifically, the information processing apparatus according to an embodiment determines that the predetermined condition concerning the selection is satisfied if, for example, a predetermined motion of eyes is detected based on information about the motion of eyes of the user. As the predetermined motion of eyes according to the second example of the determination processing, for example, various motions such as one blinking motion, a plurality of continuous blinking motions, and a winking motion can be cited.

The information processing apparatus according to an embodiment determines whether the predetermined condition concerning the selection of an object is satisfied by performing, for example, the determination processing according to the first example shown in (1-1) or the determination processing according to the second example shown in (1-2).

However, the determination processing according to an embodiment is not limited to the processing that determines whether the predetermined condition concerning the selection of an object is satisfied.

When, for example, an object is maintained in a selected state, the user may desire that the selected state of the object be canceled. Thus, when an object is maintained in a selected state, the information processing apparatus according to an embodiment may further determine whether a predetermined condition concerning the cancellation of the selection of an object is satisfied based on information about eyes of the user as the determination processing according to an embodiment.

More specifically, the information processing apparatus according to an embodiment performs, for example, determination processing according to a third example or determination processing according to a fourth example shown below.

(1-3) Third Example of the Determination Processing: When the Predetermined Condition Concerning the Cancellation of the Selection of an Object is a Condition Concerning the Time When the predetermined condition concerning the cancellation of the selection is a condition concerning the time, the information processing apparatus according to an embodiment determines whether the predetermined condition concerning the cancellation of the selection of an object is satisfied based on the time obtained based on information about eyes of the user.

More specifically, the information processing apparatus according to an embodiment determines that the predetermined condition concerning the cancellation of the selection is satisfied if, for example, the time in which the position of the line of sight indicated by information about eyes of the user is inside a second region is longer than a set second setting time. The information processing apparatus according to an embodiment may also determine that the predetermined condition concerning the cancellation of the selection is satisfied if, for example, the time in which the position of the line of sight indicated by information about eyes of the user is inside the second region is equal to the second setting time or longer.

The second region according to an embodiment is, for example, a region of the display screen in which an object that is a selection candidate object according to an embodiment and is different from an object in a selected state is displayed.

As the second setting time according to an embodiment, for example, a preset time based on an operation of the manufacturer of the information processing apparatus according to an embodiment or the user can be cited. When the second setting time according to an embodiment is a preset time, the information processing apparatus according to an embodiment determines whether the predetermined condition concerning the cancellation of the selection is satisfied based on the time in which the position of the line of sight indicated by information about eyes of the user is within the second region and the preset second setting time.

However, the second setting time according to an embodiment is not limited to a preset time.

Like the dynamic setting of the first setting time in the determination processing according to the first example, for example, the information processing apparatus according to an embodiment can dynamically set the second setting time based on the size of movement of eyes of the user based on changes of the position of the line of sight indicated by information about eyes of the user and determine whether the predetermined condition concerning the cancellation of the selection is satisfied based on the dynamically set second setting time.

When, for example, the user observes another selection candidate object closely while some object is brought to a selected state, the user may desire that the selected object be canceled and the other selection candidate object be selected. As described above, when a selection candidate object is observed closely, the movement of eyes of the user frequently is limited to a smaller range.

Thus, when the position of the line of sight indicated by information about eyes of the user is inside the second region, like, for example, the determination processing according to the first example, the information processing apparatus according to an embodiment grasps the region containing positions of the line of sight indicated by information about eyes of the user that have changed in a set predetermined time as the size of movement of eyes of the user. Then, the information processing apparatus according to an embodiment sets the second setting time corresponding to the size of movement of eyes of the user.

More specifically, for example, when the position of the line of sight indicated by information about eyes of the user is inside the second region, the information processing apparatus according to an embodiment identifies the region containing positions of the line of sight indicated by information about eyes of the user that have changed in a set predetermined time and calculates the area of the identified region. Then, the information processing apparatus according to an embodiment sets the second setting time corresponding to the area of the identified region, that is, the second setting time corresponding to the size of movement of eyes of the user based on, for example, a table (or a database) in which the area of region and the second setting time are associated and the area of the identified region.

However, the method of dynamically setting the second setting time based on information about eyes of the user according to an embodiment is not limited to the above method. For example, the information processing apparatus according to an embodiment may calculate an absolute value of a vector showing changes of the position of the line of sight indicated by information about eyes of the user to set the second setting time corresponding to the maximum value of the absolute value in a set predetermined time. The information processing apparatus according to an embodiment can also use any method capable of dynamically setting the second setting time based on information about eyes of the user.

(1-4) Fourth Example of the Determination Processing: When the Predetermined Condition Concerning the Cancellation of the Selection of an Object is a Condition Concerning the Shape of Eyes of the User As described above, information about eyes of the user according to an embodiment may contain information about the motion of eyes of the user. Also, as described above, the information processing apparatus according to an embodiment can determine whether a predetermined motion of eyes is performed by using information about the motion of eyes of the user (for example, data showing the motion of eyes of the user or data that can be used to identify the motion of eyes of the user).

When the predetermined condition concerning the cancellation of the selection is a condition concerning the shape of eyes of the user, the information processing apparatus according to an embodiment determines whether the predetermined condition concerning the cancellation of the selection of an object is satisfied based on the motion of eyes determined based on information about the motion of eyes of the user contained in information about eyes of the user.

More specifically, the information processing apparatus according to an embodiment determines that the predetermined condition concerning the cancellation of the selection is satisfied if, for example, a predetermined motion of eyes is detected based on information about the motion of eyes of the user. As the predetermined motion of eyes according to the fourth example of the determination processing, for example, various motions such as one blinking motion, a plurality of continuous blinking motions, and a winking motion can be cited.

When an object is brought to a selected state, the information processing apparatus according to an embodiment determines whether the predetermined condition concerning the cancellation of the selection of an object is satisfied by performing, for example, the determination processing according to the third example shown in (1-3) or the determination processing according to the fourth example shown in (1-4).

As the determination processing according to an embodiment, the information processing apparatus according to an embodiment performs, for example, "processing to determine whether the predetermined condition concerning the selection of an object is satisfied (for example, the determination processing according to the first example or the determination processing according to the second example)" or "processing to determine whether the predetermined condition concerning the selection of an object is satisfied and processing to determine whether the predetermined condition concerning the cancellation of the selection of an object is satisfied (for example, the determination processing according to the third example or the determination processing according to the fourth example)".

(2) Display Control Processing

When, for example, the predetermined condition concerning the selection is determined to be satisfied in the processing (determination processing) in (1), the information processing apparatus according to an embodiment brings an object displayed in the position of the line of sight indicated by information about eyes of the user on the display screen to a selected state.

(2-1) First Example of the Display Control Processing: When a Static Object as a Selection Candidate Object is Brought to a Selected State by a Moving Object First, as the first example of the display control processing according to an embodiment, an example of the display control processing when a static object as a selection candidate object is brought to a selected state by a moving object will be described.

When an object is not in a selected state, that is, the predetermined condition concerning the selection is not determined to be satisfied in the processing (determination processing) in (1), the information processing apparatus according to an embodiment causes a display unit to display, based on, for example, information about eyes of the user, the moving object in a position corresponding to the position of the line of sight of the user indicated by the information about eyes of the user on the display screen.

The information processing apparatus according to an embodiment causes the display unit to display the moving object such that, for example, coordinates of the display screen indicated by the position of the line of sight of the user indicated by information about eyes of the user and coordinates of the reference position of the moving object match. As the reference position of the moving object, for example, any preset position in the moving object such as a center position of the moving object can be cited.

However, the method of displaying the moving object according to an embodiment is not limited to the above method.

For example, the information processing apparatus according to an embodiment can selectively cause the display unit to display the moving object. For example, when the position of the line of sight of the user indicated by information about eyes of the user on the display screen is present within the region (first region) of the display screen where a selection candidate object according to an embodiment is displayed, the information processing apparatus according to an embodiment causes the display unit to selectively display the moving object.

For example, as described above, the user can visually grasp whether an object can be brought to a selected state based on a display state of a moving object by the moving object being selectively displayed when the position of the line of sight of the user indicated by information about eyes of the user on the display screen is present within the first region. Therefore, for example, in the above case, the information processing apparatus according to an embodiment can further enhance the convenience of the user by the moving object being selectively displayed when the position of the line of sight of the user indicated by information about eyes of the user on the display screen is present within the first region.

When an object is not in a selected state, for example, as described above, the information processing apparatus according to an embodiment causes the display unit to display, based on information about eyes of the user, the moving object in a position corresponding to the position of the line of sight of the user indicated by the information about eyes of the user on the display screen.

When the predetermined condition concerning the selection is determined to be satisfied in the processing (determination processing) in (1) and an object is in a selected state, the information processing apparatus according to an embodiment does not change the position where the moving object is displayed on the display screen even if the position of the line of sight of the user indicated by information about eyes of the user changes. That is, when an object is in a selected state, the position where the moving object according to an embodiment is displayed on the display screen does not change depending on the position of the line of sight of the user indicated by information about eyes of the user.

Also when the predetermined condition concerning the selection is determined to be satisfied in the processing (determination processing) in (1) and an object is brought to a selected state, the information processing apparatus according to an embodiment may change, for example, a display mode of the moving object. An example of changing the display mode of the moving object by the information processing apparatus according to an embodiment will be described later.

By changing the display mode of the moving object by the information processing apparatus according to an embodiment between a case when the predetermined condition concerning the selection is not determined to be satisfied in the processing (determination processing) in (1) and a case when the predetermined condition concerning the selection is determined to be satisfied in the processing (determination processing) in (1), the user can visually grasp that an object is brought to a selected state. Thus, when an object is brought to a selected state after the predetermined condition concerning the selection being determined to be satisfied in the processing (determination processing) in (1), the information processing apparatus according to an embodiment can further enhance the convenience of the user by changing the display mode of the moving object.

FIG. 1 is an explanatory view illustrating an example of processing according to an information processing method according to an embodiment and shows an example a selected state of an object by display control processing according to an embodiment. FIG. 1 shows an example of images displayed on the display screen when the display mode of the moving object is changed between a case when an object is not brought to a selected state and a case when an object is brought to a selected state by the information processing apparatus according to an embodiment. A of FIG. 1 shows an example of the state in which an object is not selected and B of FIG. 1 shows an example of the state in which an object is selected.

In FIG. 1, the moving object is indicated by reference numeral O (hereinafter, may be presented as the "moving object O") and shows an example in which the moving object O is a cursor. Each thumbnail image displayed in a region indicated by reference numeral R on the display screen shown in A and B of FIG. 1 corresponds to an example of the selection candidate object according to an embodiment.

An example of the display control processing according to an embodiment will be described by taking a case when a static object as a selection candidate object is selected by the moving object O shown in FIG. 1 as an example. It is needless to say that the selected state of an object realized by the display control processing according to an embodiment is not limited to the example shown in FIG. 1. As another example of the selected state of an object realized by the display control processing according to an embodiment, for example, an application example of processing according to the information processing method according to an embodiment can be cited.

When the predetermined condition concerning the selection is not determined to be satisfied in the processing (determination processing) in (1), the information processing apparatus according to an embodiment causes the display unit to display the moving object O in a position corresponding to the position of the line of sight of the user indicated by information about eyes of the user.

Also when the predetermined condition concerning the selection is not determined to be satisfied in the processing (determination processing) in (1), as described above, the information processing apparatus according to an embodiment does not change the position where the moving object is displayed on the display screen even if the position of the line of sight of the user indicated by information about eyes of the user should change.

Also, as shown by, for example, the moving object O shown in A of FIG. 1 and the moving object O shown in B of FIG. 1, the display mode of the moving object O is changed between a case when the predetermined condition concerning the selection is not determined to be satisfied in the processing (determination processing) in (1) and a case when the predetermined condition concerning the selection is determined to be satisfied by the information processing apparatus according to an embodiment.

Processing related to the display mode performed on the moving object O by the information processing apparatus according to an embodiment includes, for example, examples shown (i) and (ii) below. It is needless to say that examples of processing related to the display mode performed on the moving object O according to an embodiment are not limited to the examples shown (i) and (ii) below.

(i) Examples of processing related to the display mode when the predetermined condition concerning the selection is not determined to be satisfied in the processing (determination processing) in (1)

Move the moving object O in the x-axis, y-axis, and z-axis directions on the display screen around the reference position of the moving object O (for example, moving the moving object O randomly or in a predetermined pattern)

Blink the moving object O

Perform processing such as adding a shadow to the moving object O

Combine the above (ii) Examples of processing related to the display mode when the predetermined condition concerning the selection is determined to be satisfied in the processing (determination processing) in (1)

Do not move the moving object O regardless of changes of the position of the line of sight indicated by information about eyes of the user Do not move the moving object O in the x-axis, y-axis, and z-axis directions on the display screen around the reference position of the moving object O (if the moving object O moves when the predetermined condition concerning the selection is not determined to be satisfied)

Do not blink the moving object O (if the moving object O blinks when the predetermined condition concerning the selection is not determined to be satisfied)

Delete processing such as adding a shadow performed on the moving object O (if processing is performed when the predetermined condition concerning the selection is not determined to be satisfied)

Combine the moving object O and the background by alpha blending or the like (2-2) Second Example of the Display Control Processing: When the Moving Object as a Selection Candidate Object is Brought to a Selected State Next, as the second example of the display control processing according to an embodiment, an example of the display control processing when the moving object as a selection candidate object is brought to a selected state will be described.

Like, for example, the display control processing according to the first example, the information processing apparatus according to an embodiment causes the display unit to display, based on information about eyes of the user, the moving object in a position corresponding to the position of the line of sight of the user indicated by the information about eyes of the user on the display screen.

When the predetermined condition concerning the selection is determined to be satisfied in the processing (determination processing) in (1) and an object is brought to a selected state, for example, the information processing apparatus according to an embodiment changes the display mode of the moving object.

Processing related to the display mode performed on the moving object in the display control processing according to the second example by the information processing apparatus according to an embodiment includes, for example, like the display control processing according to the first example, examples shown in (i) and (ii) above.

However, processing related to the display mode performed on the moving object in the display control processing according to the second example is not limited to processing similar to the display control processing according to the first example.

When, for example, the predetermined condition concerning the selection is determined to be satisfied in the processing (determination processing) in (1), the information processing apparatus according to an embodiment may delete the moving object as a selection candidate object to be brought to a selected state from the display screen. When the moving object as a selection candidate object to be brought to a selected state is deleted, the information processing apparatus according to an embodiment may delete the moving object instantaneously from the display screen or by using various representations such as the fade-out representation.

When the predetermined condition concerning the selection is determined to be satisfied in the processing (determination processing) in (1), the information processing apparatus according to an embodiment brings an object displayed in the position of the line of sight indicated by information about eyes of the user on the display screen to a selected state by performing the display control processing according to the first example shown in (2-1) or the display control processing according to the second example shown in (2-2).

However, the display control processing according to an embodiment is not limited to processing when the predetermined condition concerning the selection is determined to be satisfied in the processing (determination processing) in (1).

(2-3) Third Example of the Display Control Processing

For example, as described above, the information processing apparatus according to an embodiment can determine whether the predetermined condition concerning the cancellation of the selection of an object is satisfied in the processing (determination processing) in (1). When the predetermined condition concerning the cancellation of the selection of an object is determined to be satisfied in the processing (determination processing) in (1), the information processing apparatus according to an embodiment may bring the object in a selected state to a non-selected state as display control processing according to an embodiment.

When the object in a selected state is brought to a non-selected state, as described above, the information processing apparatus according to an embodiment changes the position where the moving object is displayed on the display screen, for example, in accordance with the position of the line of sight of the user indicated by information about eyes of the user.

If, for example, the position of the line of sight indicated by information about eyes of the user is within the second region when the determination processing according to the third example shown in (1-3) is performed in the processing (determination processing) in (1), the information processing apparatus according to an embodiment may stepwise change the display mode concerning the object in a selected state in accordance with the time in which the position of the line of sight is within the second region. The second region according to an embodiment is, as described above, a region of the display screen in which a selection candidate object other than the object in a selected state and corresponding to the position of the line of sight of indicated by information about eyes of the user is displayed.

More specifically, for example, the information processing apparatus according to an embodiment switches the processing related to the display mode performed on the moving object displayed in a position corresponding to the object in a selected state from the processing shown in (ii) to the processing shown in (i). Also, the information processing apparatus according to an embodiment increases the magnitude (for example, the magnitude of movement, the speed of blinking, and the strength of processing performed) of the processing shown in (i) with an increasing time in which the position of the line of sight indicated by information about eyes of the user is within the second region. When, for example, the predetermined condition concerning the cancellation of the selection of an object is determined to be satisfied in the determination processing according to the third example shown in (1-3), the information processing apparatus according to an embodiment stepwise increases the magnitude of the processing shown in (i) so that the magnitude of the processing shown in (i) becomes the greatest magnitude among set magnitudes.

However, the display control processing when the determination processing according to the third example shown in (1-3) is performed in the processing (determination processing) in (1) not limited to the above processing.

For example, the information processing apparatus according to an embodiment may change the display mode of a selection candidate object (selection candidate object other than the object in a selected state and corresponding to the position of the line of sight indicated by information about eyes of the user) corresponding to the second region. The information processing apparatus according to an embodiment changes the display mode of the selection candidate object corresponding to the second region by, for example, the processing in (i) on the selection candidate object corresponding to the second region. It is needless to say that the processing to change the display mode of the selection candidate object corresponding to the second region is not limited to the processing shown in (i).

As the display control processing according to an embodiment, the information processing apparatus according to an embodiment performs, for example, "the display control processing according to the first example shown in (2-1) or the display control processing according to the second example shown in (2-2)", "the display control processing according to the first example and the display control processing according to the third example shown in (2-3)", or "the display control processing according to the second example and the display control processing according to the third example shown in (2-3)".

When "the display control processing according to the first example shown in (2-1) or the display control processing according to the second example shown in (2-2)" is performed as the display control processing according to an embodiment, the image displayed on the display screen changes, for example, from the state as shown in A of FIG. 1 to the state as shown in B of FIG. 1 based on a result of the processing (determination processing) in (1). When "the display control processing according to the first example and the display control processing according to the third example shown in (2-3)", or "the display control processing according to the second example and the display control processing according to the third example shown in (2-3)" are performed as the display control processing according to an embodiment, the image displayed on the display screen changes, for example, from the state as shown in A of FIG. 1 to the state as shown in B of FIG. 1 or from the state as shown in B of FIG. 1 to the state as shown in A of FIG. 1 based on a result of the processing (determination processing) in (1). It is needless to say that the change of the display screen by the display control processing according to an embodiment is not limited to the examples shown in FIG. 1.

The information processing apparatus according to an embodiment performs the processing (determination processing) in (1) and the processing (display control processing) in (2) as the information processing method according to an embodiment.

The information processing apparatus according to an embodiment determines whether the predetermined condition concerning the selection of an object is satisfied based on information about eyes of the user in the processing (determination processing) in (1). If the predetermined condition concerning the selection of an object is determined to be satisfied in the processing (determination processing) in (1), the information processing apparatus according to an embodiment brings the object displayed in the position of the line of sight indicated by information about eyes of the user on the display screen to a selected state in the processing (display control processing) in (2).

The object brought to a selected state by the information processing apparatus according to an embodiment is not affected by the movement of the line of sight of the user even if the line of sight of the user should move after being brought to a selected state. Therefore, with an object displayed on the display screen being brought to a selected state based on the movement of the line of sight of the user in the processing (display control processing) in (2) by the information processing apparatus according to an embodiment, for example, the occurrence of a situation that can cause degradation of the convenience of the user, for example, a state in which "an object attempted to be arranged in a desired position is moved by being influenced by the movement of eyes" can be prevented.

Therefore, the information processing apparatus according to an embodiment can enhance the convenience of the user when the user operates an object displayed on the display screen through the movement of the line of sight by performing the processing (determination processing) in (1) and the processing (display control processing) in (2) as the processing according to the information processing method according to an embodiment.

When an object is in a selected state, the information processing apparatus according to an embodiment can determine whether the predetermined condition concerning the cancellation of the selection of an object is satisfied in the processing (determination processing) in (1). If the predetermined condition concerning the cancellation of the selection is determined to be satisfied in the processing (determination processing) in (1), the information processing apparatus according to an embodiment brings the object in a selected state to a non-selected state in the processing (display control processing) in (2).

The position displayed on the display screen of the object brought to a non-selected state by the information processing apparatus according to an embodiment moves in accordance with the position of the line of sight of the user indicated by information about eyes of the user.

Therefore, the convenience of the user can be enhanced like, for example, "allowing the user to reselect the object" by the object in a selected state being brought to a non-selected state based on the movement of the line of sight of the user in the processing (display control processing) in (2) by the information processing apparatus according to an embodiment.

Figure 2:
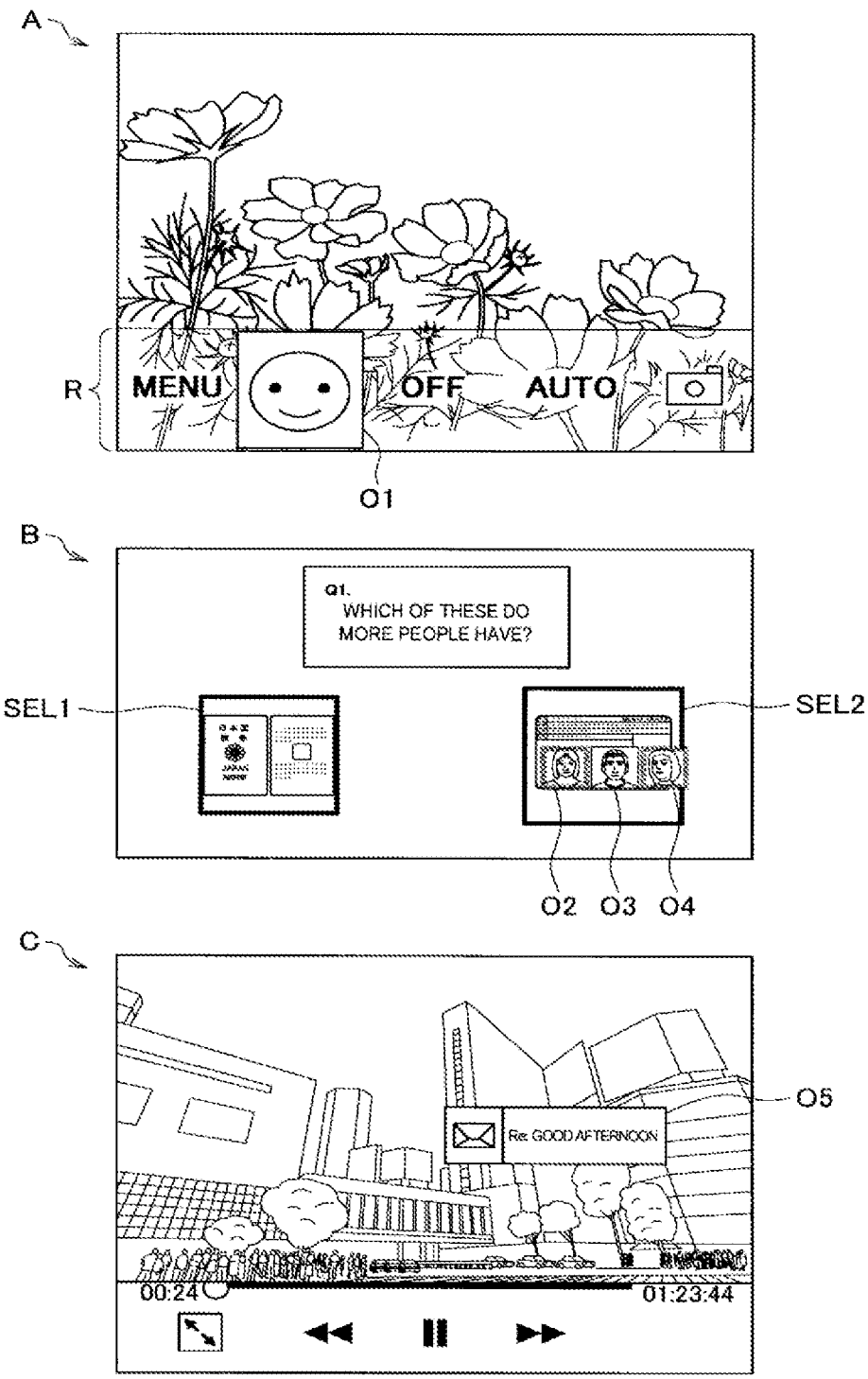
FIG. 2 is an explanatory view illustrating application examples of the processing according to the information processing method according to an embodiment.

3. Application Examples of Processing According to the Information Processing Method According to an Embodiment Next, application examples (use cases) of processing according to the information processing method according to an embodiment described above will be presented. FIG. 2 is an explanatory view illustrating application examples of the processing according to the information processing method according to an embodiment.

(I) First Application Example of Processing According to the Information Processing Method According to an Embodiment: As Shown in A of FIG. 2

As shown in FIG. 2 shows an example when processing according to the information processing method according to an embodiment is applied to movement of the cursor (example of the moving object). In A of FIG. 2, an object indicated by reference sign O1 shows the cursor as a moving object. Also in A of FIG. 2, each icon indicated by reference sign R corresponds to an example of the selection candidate object according to an embodiment.

If the user views a list portion (region R shown in A of FIG. 2) of a menu item, the cursor moves following the line of sight. The above is realized by the processing (display control processing) in (2) being performed by the information processing apparatus according to an embodiment.

If, for example, the user views one item (on selection candidate object according to an embodiment) of the menu items for a fixed time, the cursor is stuck (the cursor does not move). That is, the stuck cursor does not move following the line of sight of the user. In the example shown in A of FIG. 2, the selection candidate object present in the position where the cursor is stuck is selected by the cursor being stuck. The above is realized by, for example, the determination processing according to the first example shown (1-1) and the display control processing according to the first example shown (2-1) being performed by the information processing apparatus according to an embodiment.

If, for example, the user views another place other than the selection candidate object selected by the cursor (for example, another selection candidate object), the stuck cursor begins to float. Then, when the maximum floating state is reached, the cursor moves again following the line of sight of the user. The above is realized by, for example, the determination processing according to the third example shown (1-3) and the display control processing according to the third example shown (2-3) being performed by the information processing apparatus according to an embodiment.

(II) Second Application Example of Processing According to the Information Processing Method According to an Embodiment: As Shown in B of FIG. 2

B of FIG. 2 shows an example when processing according to the information processing method according to an embodiment is applied to a reply selection in a game. In B of FIG. 2, each of objects indicated by reference signs O2 to O4 shows a moving object displayed in the position of the line of sight of the user indicated by information about eyes of the user corresponding to each user. In B of FIG. 2, an example using a captured image showing a face portion of the imaged user as a moving object, but the moving object related to the example of B in FIG. 2 may be an image, for example, an image showing a character corresponding to each user or an image showing letters. Also in B of FIG. 2, objects indicated by reference signs SEL1, SEL2 correspond to examples of the selection candidate object according to an embodiment.

When the user decides his (her) reply, the user views the object (selection candidate object according to an embodiment) corresponding to the reply for a fixed time. When the user views the object corresponding to the reply for a fixed time, the moving object corresponding to the user is fixed on the object corresponding to the reply (the moving object does not move). That is, the fixed moving object does not move following the line of sight of the user. In the example shown in B of FIG. 2, the object present in the position where the moving object is fixed and corresponding to the reply is selected by the moving object being fixed. The above is realized by, for example, the determination processing according to the first example shown (1-1) and the display control processing according to the first example shown (2-1) being performed by the information processing apparatus according to an embodiment.

Because the moving object corresponding to the user is fixed on the object corresponding to the reply, the moving object does not move following the line of sight of the user. Thus, the user can check replies selected by other users when the user's reply is decided.

If the user desires to change the reply, when, for example, the user views another place other than the selection candidate object selected by the moving object (for example, another selection candidate object), the fixed moving object begins to float. Then, when the maximum floating state is reached, the moving object moves again following the line of sight of the user. Thus, the user can change his (her) reply. The above is realized by, for example, the determination processing according to the third example shown (1-3) and the display control processing according to the third example shown (2-3) being performed by the information processing apparatus according to an embodiment.

(III) Third Application Example of Processing According to the Information Processing Method According to an Embodiment: As Shown in C of FIG. 2

C of FIG. 2 shows an example when processing according to the information processing method according to an embodiment is applied to the selection of a notification object. In C of FIG. 2, an object indicated by reference sign O5 shows a notification object. The notification object indicated by reference sign O5 in C of FIG. 2 corresponds to an example of the moving object according to an embodiment and also corresponds to an example of the selection candidate object according to an embodiment.

The information processing apparatus according to an embodiment causes the display unit to display a notification object in a position corresponding to a user's peripheral visual field on the display screen based on the position of the line of sight of the user indicated by information about eyes of the user. If the user does not view the notification object for a fixed time (for example, a time so that the content indicated by the notification object can be read through or so), for example, the information processing apparatus according to an embodiment moves the notification object following the line of sight within the peripheral visual field such that the line of sight of the user is not obstructed. The above is realized by the processing (display control processing) in (2) being performed by the information processing apparatus according to an embodiment.

If the user views the notification object for a fixed time (for example, a time so that the content indicated by the notification object can be read through or so), the notification object is stuck. That is, the stuck notification object does not move following the line of sight of the user. Then, the notification object disappears from the display screen thereafter (for example, after a few seconds). In the example shown in C of FIG. 2, the notification object is selected by the notification object being stuck before disappearing from the display screen. The above is realized by, for example, the determination processing according to the first example shown (1-1) and the display control processing according to the second example shown (2-2) being performed by the information processing apparatus according to an embodiment.

For example, the first application example shown in (I) to the third application example shown in (III) are realized by the above processing according to the information processing method according to an embodiment being performed by the information processing apparatus according to an embodiment. It is needless to say that application examples of the processing according to the information processing method according to an embodiment are not limited to the first application example to the third application example.

(Information Processing Apparatus According to an Embodiment)

Next, an example of the configuration of an information processing apparatus according to an embodiment capable of performing the processing according to the information processing method according to an embodiment described above will be described.

Figure 3:
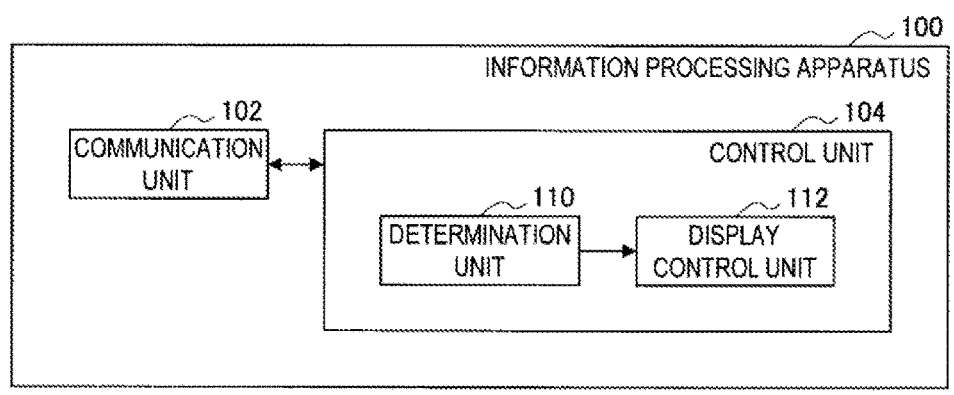
FIG. 3 is a block diagram showing an example of the configuration of an information processing apparatus according to an embodiment.

FIG. 3 is a block diagram showing an example of the configuration of an information processing apparatus 100 according to an embodiment. The information processing apparatus 100 includes, for example, a communication unit 102 and a control unit 104.

The information processing apparatus 100 may also include, for example, a ROM (Read Only Memory, not shown), a RAM (Random Access Memory, not shown), a storage unit (not shown), an operation unit (not shown) that can be operated by the user, and a display unit (not shown) that displays various screens on the display screen. The information processing apparatus 100 connects each of the above elements by, for example, a bus as a transmission path.

The ROM (not shown) stores programs used by the control unit 104 and control data such as operation parameters. The RAM (not shown) temporarily stores programs executed by the control unit 104 and the like.

The storage unit (not shown) is a storage means included in the information processing apparatus 100 and stores, for example, data related to the information processing method according to an embodiment such as data indicating various objects displayed on the display screen and various kinds of data such as applications. As the storage unit (not shown), for example, a magnetic recording medium such as a hard disk and a nonvolatile memory such as a flash memory can be cited. The storage unit (not shown) may be removable from the information processing apparatus 100.

As the operation unit (not shown), an operation input device described later can be cited. As the display unit (not shown), a display device described later can be cited.

(Hardware Configuration Example of the Information Processing Apparatus 100)

Figure 4:
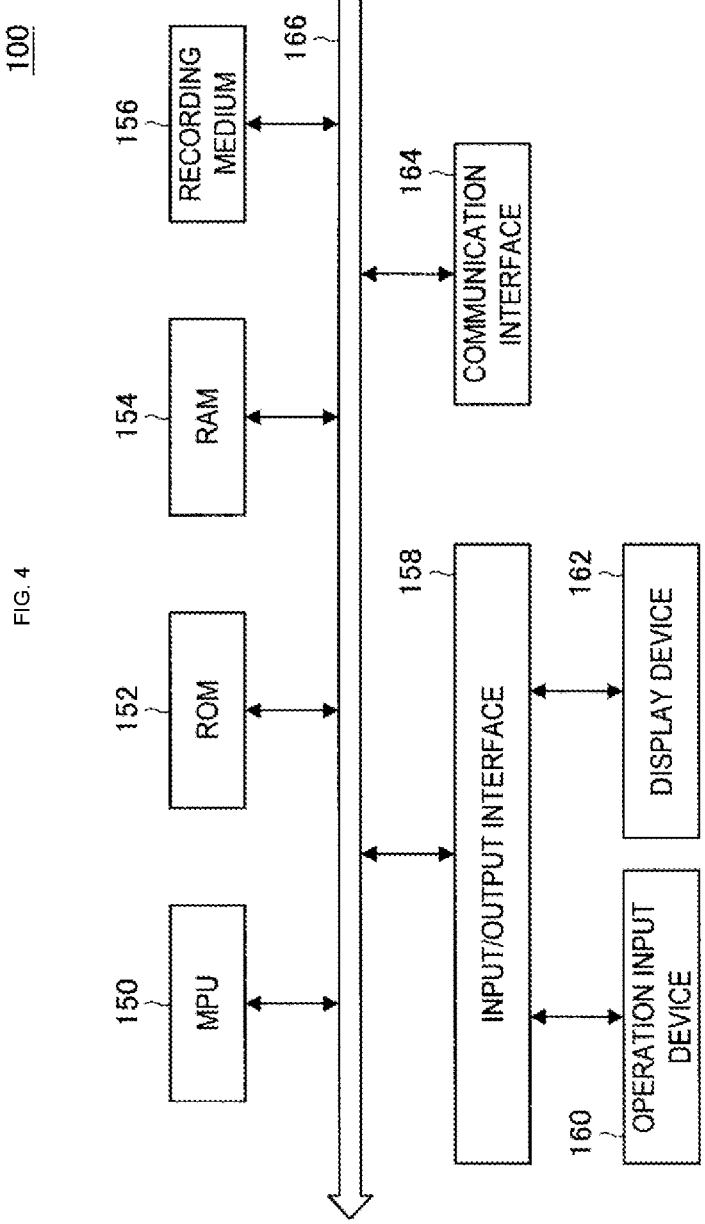
FIG. 4 is an explanatory view showing an example of a hardware configuration of the information processing apparatus according to an embodiment.

FIG. 4 is an explanatory view showing an example of the hardware configuration of the information processing apparatus 100 according to an embodiment. The information processing apparatus 100 includes, for example, an MPU 150, a ROM 152, a RAM 154, a recording medium 156, an input/output interface 158, an operation input device 160, a display device 162, and a communication interface 164. The information processing apparatus 100 connects each structural element by, for example, a bus 166 as a transmission path of data.

The MPU 150 is constituted of a processor such as a MPU (Micro Processing Unit) and various processing circuits and functions as the control unit 104 that controls the whole information processing apparatus 100. The MPU 150 also plays the role of, for example, a determination unit 110 and a display control unit 112 described later in the information processing apparatus 100.

The ROM 152 stores programs used by the MPU 150 and control data such as operation parameters. The RAM 154 temporarily stores programs executed by the MPU 150 and the like.

The recording medium 156 functions as a storage unit (not shown) and stores, for example, data related to the information processing method according to an embodiment such as data indicating various objects displayed on the display screen and various kinds of data such as applications. As the recording medium 156, for example, a magnetic recording medium such as a hard disk and a nonvolatile memory such as a flash memory can be cited. The recording medium 156 may be removable from the information processing apparatus 100.

The input/output interface 158 connects, for example, the operation input device 160 and the display device 162. The operation input device 160 functions as an operation unit (not shown) and the display device 162 functions as a display unit (not shown). As the input/output interface 158, for example, a USB (Universal Serial Bus) terminal, a DVI (Digital Visual Interface) terminal, an HDMI (High-Definition Multimedia Interface) (registered trademark) terminal, and various processing circuits can be cited. The operation input device 160 is, for example, included in the information processing apparatus 100 and connected to the input/output interface 158 inside the information processing apparatus 100. As the operation input device 160, for example, a button, a direction key, a rotary selector such as a jog dial, and a combination of these devices can be cited. The display device 162 is, for example, included in the information processing apparatus 100 and connected to the input/output interface 158 inside the information processing apparatus 100. As the display device 162, for example, a liquid crystal display and an organic electro-luminescence display (also called an OLED display (Organic Light Emitting Diode Display)) can be cited.

It is needless to say that the input/output interface 158 can also be connected to an external device such as an operation input device (for example, a keyboard and a mouse) and a display device as an external apparatus of the information processing apparatus 100. The display device 162 may be a device capable of both the display and user operations like, for example, a touch screen.

The communication interface 164 is a communication means included in the information processing apparatus 100 and functions as the communication unit 102 to communicate with an external device or an external apparatus such as an external imaging device, an external display device, an external sensor, and an external apparatus that generates information about eyes of the user according to an embodiment via a network (or directly) wirelessly or through a wire. As the communication interface 164, for example, a communication antenna and RF (Radio Frequency) circuit (wireless communication), an IEEE802.15.1 port and transmitting/receiving circuit (wireless communication), an IEEE802.11 port and transmitting/receiving circuit (wireless communication), and a LAN (Local Area Network) terminal and transmitting/receiving circuit (wire communication) can be cited. As the network according to an embodiment, for example, a wire network such as LAN and WAN (Wide Area Network), a wireless network such as wireless LAN (WLAN: Wireless Local Area Network) and wireless WAN (WWAN: Wireless Wide Area Network) via a base station, and the Internet using the communication protocol such as TCP/IP (Transmission Control Protocol/Internet Protocol) can be cited.

With the configuration shown in, for example, FIG. 4, the information processing apparatus 100 performs processing according to the information processing method according to an embodiment. However, the hardware configuration of the information processing apparatus 100 according to an embodiment is not limited to the configuration shown in FIG. 4.

The information processing apparatus 100 may include, for example, an imaging device playing the role of an imaging unit (not shown) that captures moving images or still images. When an imaging device is included, for example, the information processing apparatus 100 can obtain information about eyes of the user by processing a captured image generated by imaging in the imaging device. Also when an imaging device is included, for example, the information processing apparatus 100 can use a captured image (or a portion thereof) generated by imaging in the imaging device as an object.

As the imaging device according to an embodiment, for example, a lens/image sensor and a signal processing circuit can be cited. The lens/image sensor is constituted of, for example, an optical lens and an image sensor using a plurality of image sensors such as CMOS (Complementary Metal Oxide Semiconductor). The signal processing circuit includes, for example, an AGC (Automatic Gain Control) circuit or an ADC (Analog to Digital Converter) to convert an analog signal generated by the image sensor into a digital signal (image data). The signal processing circuit may also perform various kinds of signal processing, for example, the white balance correction processing, tone correction processing, gamma correction processing, YCbCr conversion processing, and edge enhancement processing.

The information processing apparatus 100 may further include, for example, a sensor plating the role of a detection unit (not shown) that obtains data that can be used to identify the position of the line of sight of the user according to an embodiment. When such a sensor is included, the information processing apparatus 100 can improve the estimation accuracy of the position of the line of sight of the user by using, for example, data obtained from the sensor.

As the sensor according to an embodiment, for example, any sensor that obtains detection values that can be used to improve the estimation accuracy of the position of the line of sight of the user such as an infrared ray sensor can be cited.

When configured to, for example, perform processing on a standalone basis, the information processing apparatus 100 may not include the communication interface 164. The information processing apparatus 100 may also be configured not to include the recording medium 156, the operation device 160, or the display device 162.

Referring to FIG. 3, an example of the configuration of the information processing apparatus 100 will be described. The communication unit 102 is a communication means included in the information processing apparatus 100 and communicates with an external device or an external apparatus such as an external imaging device, an external display device, an external sensor, and an external apparatus that generates information about eyes of the user according to an embodiment via a network (or directly) wirelessly or through a wire. Communication of the communication unit 102 is controlled by, for example, the control unit 104.

As the communication unit 102, for example, a communication antenna and RF circuit and a LAN terminal and transmitting/receiving circuit can be cited, but the configuration of the communication unit 102 is not limited to the above example. For example, the communication unit 102 may adopt a configuration conforming to any standard capable of communication such as a USB terminal and transmitting/receiving circuit or any configuration capable of communicating with an external apparatus via a network.

The control unit 104 is configured by, for example, an MPU and plays the role of controlling the whole information processing apparatus 100. The control unit 104 includes, for example, the determination unit 110 and the display control unit 112 and plays a leading role of performing the processing according to the information processing method according to an embodiment.

The determination unit 110 plays a leading role of performing the processing (determination processing) in (1).

The determination unit 110 determines whether the predetermined condition concerning the selection of an object is satisfied based on, for example, information about eyes of the user. More specifically, the determination unit 110 performs, for example, the determination processing according to the first example shown in (1-1) or the determination processing according to the second example shown in (1-2).

The determination unit 110 uses, for example, information about eyes of the user received by the communication unit 102 from an external apparatus. When the information processing apparatus 100 includes, for example, an imaging unit (not shown) or a detection unit (not shown), the determination unit 110 can generate information about eyes of the user and use the generated information about eyes of the user.

When an object is in a selected state, the determination unit 110 may determine whether the predetermined condition concerning the cancellation of the selection of an object is satisfied based on, for example, information about eyes of the user. More specifically, the determination unit 110 performs, for example, the determination processing according to the third example shown in (1-3) or the determination processing according to the fourth example shown in (1-4).

The display control unit 112 plays a leading role of performing the processing (display control processing) in (2).

If, for example, the determination unit 110 determines that the predetermined condition concerning the selection is satisfied, the display control unit 112 brings the object displayed in the position of the line of sight indicated by information about eyes of the user on the display screen to a selected state. More specifically, the display control unit 112 performs, for example, the display control processing according to the second example shown in (2-1) or the display control processing according to the second example shown in (2-2).

If, for example, the determination unit 110 determines that the predetermined condition concerning the cancellation of the selection is satisfied, the display control unit 112 brings the object in a selected state to a non-selected state. More specifically, the display control unit 112 performs, for example, the display control processing according to the third example shown in (2-3).

By including, for example, the determination unit 110 and the display control unit 112, the control unit 104 leads the processing according to the information processing method according to an embodiment.

With the configuration shown in, for example, FIG. 3, the information processing apparatus 100 performs the processing (for example, the processing (determination processing) in (1) and the processing (display control processing) in (2)) according to the information processing method according to an embodiment.

Therefore, with the configuration shown in, for example, FIG. 3, the information processing apparatus 100 can enhance the convenience of the user when the user operates an object displayed on the display screen through movement of the line of sight of the user.

Also with the configuration shown in, for example, FIG. 3, the information processing apparatus 100 can achieve effects that can be achieved by, for example, the above processing according to the information processing method according to an embodiment being performed.

However, the configuration of the information processing apparatus according to an embodiment is not limited to the configuration in FIG. 3.

For example, the information processing apparatus according to an embodiment can include one or both of the determination unit 110 and the display control unit 112 shown in FIG. 3 separately from the control unit 104 (for example, realized by a separate processing circuit).

The information processing apparatus according to an embodiment may not include the communication unit 102 when communicating with an external device or an external apparatus via an external communication device having the function and configuration similar to those of the communication unit 102 or when configured to perform processing on a standalone basis.

The information processing apparatus according to an embodiment may further include, for example, an imaging unit (not shown) configured by an imaging device. When an imaging unit (not shown) is included, the information processing apparatus according to an embodiment can obtain information about eyes of the user by processing a captured image generated by imaging in the imaging unit (not shown). Also when an imaging unit (not shown) is included, for example, the information processing apparatus according to an embodiment can use a captured image (or a portion thereof) generated by imaging in the imaging unit (not shown) as an object.

The information processing apparatus according to an embodiment may further include, for example, a detection unit (not shown) configured by any sensor that obtains detection values that can be used to improve the estimation accuracy of the position of the line of sight of the user. When a detection unit (not shown) is included, the information processing apparatus according to an embodiment can improve the estimation accuracy of the position of the line of sight of the user by using, for example, data obtained from the detection unit (not shown).

In the foregoing, the information processing apparatus has been described as in embodiments as examples, but embodiments are not limited to such forms. Embodiment can also be applied to various devices, for example, a TV set, a display apparatus, a tablet apparatus, a communication apparatus such as a mobile phone and smartphone, a video/music playback apparatus (or a video/music recording and playback apparatus), a game machine, and a computer such as a PC (Personal Computer). Embodiment can also be applied to, for example, a processing IC (Integrated Circuit) that can be embedded in devices as described above.

Embodiment may also be realized by a system including a plurality of apparatuses predicated on connection to a network (or communication between each apparatus) like, for example, cloud computing. That is, the above information processing apparatus according to an embodiment can be realized as, for example, an information processing system including a plurality of apparatuses.

(Program According to an Embodiment)

The convenience of the user when the user operates an object displayed on the display screen through movement of the line of sight of the user can be enhanced by a program (for example, a program capable of performing processing according to an information processing method according to an embodiment such as the processing (determination processing) in (1) and the processing (display control processing) in (2)) causing a computer to function as an information processing apparatus according to an embodiment being performed by a processor or the like in the computer.

Also, effects achieved by the above processing according to the information processing method according to an embodiment can be achieved by a program causing a computer to function as an information processing apparatus according to an embodiment being performed by a processor or the like in the computer.

In the foregoing, embodiments of the present disclosure have been described in detail with reference to the accompanying drawings, but the technical scope of the present disclosure is not limited to the above examples. A person skilled in the art may find various alterations and modifications within the scope of the appended claims and it should be understood that they will naturally come under the technical scope of the present disclosure.

For example, the above shows that a program (computer program) causing a computer to function as an information processing apparatus according to an embodiment is provided, but an embodiment can further provide a recording medium caused to store the program.

The above configuration shows an example of an embodiment and naturally comes under the technical scope of the present disclosure.

Effects described in this specification are only descriptive or illustrative and are not restrictive. That is, the technology according to the present disclosure can achieve other effects obvious to a person skilled in the art from the description of this specification, together with the above effects or instead of the above effects.

Additionally, the present disclosure can also be configured as follows.

(1)
An information processing apparatus including:
a circuitry configured to control a state of a selection candidate object, when a predetermined condition concerning a selection of the selection candidate object is determined to be satisfied based on a relation between a display position of the selection candidate object and a position towards which the user gazes or a gazing direction, by bringing the selection candidate object to a selected state.

(2)
The information processing apparatus according to (1), wherein, when a time in which the position towards which the user gazes is within a first region of a display screen in which the selection candidate object is displayed is longer than or equal to a first setting time, the predetermined condition concerning the selection is determined to be satisfied.

(3)
The information processing apparatus according to (1) or (2),
wherein the circuitry is further configured to:
dynamically set the first setting time based on a magnitude of movement of the eyes of the user based on changes of the position towards which the user gazes; and
initiate a determination as to whether the predetermined condition concerning the selection is satisfied based on the first setting time set dynamically.

(4)
The information processing apparatus according to any of (1) to (3),
wherein the circuitry is further configured to initiate a determination as to whether the predetermined condition concerning the selection is satisfied based on the first setting time set in advance.

(5)
The information processing apparatus according to any of (1) to (4),
wherein the predetermined condition concerning the selection of the selection candidate object is determined to be satisfied based further on a relation between a display position of the selection candidate object and information about a motion of the eyes of the user, and
wherein the predetermined condition concerning the selection is determined to be satisfied when a predetermined motion of the eyes is detected based on the information about the motion of the eyes.

(6)
The information processing apparatus according to any of (1) to (5),
wherein the circuitry is further configured to cause a moving object to be displayed whose position of display moves in accordance with the position towards which the user gazes when the selection candidate object is not in the selected state.

(7)
The information processing apparatus according to any of (1) to (6),
wherein the position where the moving object is displayed is not changed when the selection candidate object is in the selected state even if the position towards which the user gazes changes.

(8)
The information processing apparatus according to any of (1) to (7),
wherein the circuitry is further configured to cause the moving object to be selectively displayed when the position towards which the user gazes is present within a region of a display screen in which the selection candidate object is displayed.

(9)

The information processing apparatus according to any of (1) to (8), wherein when the selection candidate object is brought to the selected state after the predetermined condition concerning the selection is determined to be satisfied, a display mode of the moving object is changed.

(10)

The information processing apparatus according to any of (1) to (9), wherein the selection candidate object brought to the selected state is a static object whose display position displayed does not move in accordance with a changing of the position towards which the user gazes.

(11)

The information processing apparatus according to any of (1) to (10), wherein when the selection candidate object is brought to the selected state, a determination is made as to whether the predetermined condition concerning a cancellation of the selection of the selection candidate object is satisfied based on a changing of the position towards which the user gazes, and when the predetermined condition concerning the cancellation of the selection of the object is determined to be satisfied, the selection candidate object is brought into a non-selected state from the selected state.

(12)

The information processing apparatus according to any of (1) to (11), wherein the predetermined condition concerning the cancellation of the selection is determined to be satisfied when a time in which the position towards which the user gazes is within a second region of a display screen is longer than or equal to a second setting time.

(13)

The information processing apparatus according to any of (1) to (12), wherein the second region is a region of the display screen where a second candidate object is displayed, the second candidate object also being able to be brought to the selected state and is different from the selection candidate object in the selected state.

(14)

The information processing apparatus according to any of (1) to (13), wherein the circuitry is further configured to:

dynamically set the second setting time based on a magnitude of movement of the eyes of the user based on changes of the position towards which the user gazes; and initiate a determination as to whether the predetermined condition concerning the cancellation of the selection is satisfied based on the second setting time set dynamically.

(15)

The information processing apparatus according to any of (1) to (14), wherein the circuitry is further configured to initiate a determination as to whether the predetermined condition concerning the cancellation of the selection is satisfied based on the second setting time set in advance.

(16)

The information processing apparatus according to any of (1) to (15), wherein when the position towards which the user gazes is within the second region, a display mode of the selection candidate object in the selected state is stepwise changed in accordance with the time in which the position towards which the user gazes is within the second region.

(17)

The information processing apparatus according to any of (1) to (16), wherein when the position towards which the user gazes is within the second region, a display mode of the second candidate object is changed corresponding to the second region.

(18)

The information processing apparatus according to any of (1) to (17), wherein the predetermined condition concerning the selection of the selection candidate object is determined to be satisfied based further on a relation between a display position of the selection candidate object and information about a motion of the eyes of the user, and wherein the predetermined condition concerning the cancellation of the selection is determined to be satisfied when a predetermined motion of the eyes is detected based on the information about the motion of the eyes.

(19)

The information processing apparatus according to any of (1) to (18), wherein the predetermined condition is determined to be satisfied when the position towards which the user gazes is determined to coincide with the display position of the object or the gazing direction.

(20)

An information processing method executed by an information processing apparatus, the method including:

determining whether a predetermined condition concerning a selection of a selection candidate object is satisfied based on a relation between a display position of the selection candidate object and a position towards which a user gazes or a gazing direction; and when the predetermined condition concerning the selection is determined to be satisfied, bringing the selection candidate object to a selected state.

(21)

A non-transitory computer-readable medium having embodied thereon a program, which when executed by a computer causes the computer to perform a method, the method including:

determining whether a predetermined condition concerning a selection of a selection candidate object is satisfied based on a relation between a display position of the selection candidate object and a position toward which a user gazes or a gazing direction; and when the predetermined condition concerning the selection is determined to be satisfied, bringing the selection candidate object to a selected state.

(22)

An information processing apparatus including:

a determination unit that determines whether a predetermined condition concerning a selection of an object is satisfied based on information about eyes of a user, the information containing information about a position of a line of sight of the user on a display screen; and a display control unit that, when the predetermined condition concerning the selection is determined to be satisfied, brings the object displayed in the position of the line of sight indicated by the information about the eyes of the user on the display screen to a selected state.

(23)

The information processing apparatus according to (22), wherein, when a time in which the position of the line of sight indicated by the information about the eyes of the user is within a first region of the display screen in which a selection candidate object as a target object that is able to be brought to the selected state is displayed is longer than a set first setting time or when the time in which the position of the line of sight indicated by the information about the eyes of the user is within the first region is equal to the first setting time or longer, the determination unit determines that the predetermined condition concerning the selection is satisfied.

(24)

The information processing apparatus according to (23), wherein the determination unit dynamically sets the first setting time based on a magnitude of movement of the eyes of the user based on changes of the position of the line of sight indicated by the information about the eyes of the user and determines whether the predetermined condition concerning the selection is satisfied based on the first setting time set dynamically.

(25)

The information processing apparatus according to (23), wherein the determination unit determines whether the predetermined condition concerning the selection is satisfied based on the first setting time set in advance.

(26)

The information processing apparatus according to (22), wherein the information about the eyes of the user contains the information about a motion of the eyes of the user, and wherein the determination unit determines that the predetermined condition concerning the selection is satisfied when a predetermined motion of the eyes is detected based on the information about the motion of the eyes.

(27)

The information processing apparatus according to any one of (22) to (26), wherein the display control unit causes the display screen to display a moving object whose position displayed on the display screen moves in accordance with the position of the line of sight of the user indicated by the information about the eyes of the user in the position corresponding to the position of the line of sight of the user indicated by the information about the eyes of the user on the display screen based on the information about the eyes of the user when the object is not in the selected state and the display control unit does not change the position where the moving object is displayed on the display screen even if the position of the line of sight of the user indicated by the information about the eyes of the user changes when the object is in the selected state.

(28)

The information processing apparatus according to (27), wherein the display control unit causes the display screen to selectively display the moving object when the position of the line of sight of the user indicated by the information about the eyes of the user on the display screen is present within a region of the display screen in which a selection candidate object as a target object that is able to be brought to the selected state is displayed.

(29)

The information processing apparatus according to (27) or (28), wherein when the object is brought to the selected state after the predetermined condition concerning the selection is determined to be satisfied, a display mode of the moving object is changed.

(30)

The information processing apparatus according to any one of (22) to (26), wherein the object brought to the selected state by the display control unit is a static object whose position displayed on the display screen does not move in accordance with the position of the line of sight of the user indicated by the information about the eyes of the user.

(31)

The information processing apparatus according to any one of (22) to (30), wherein when the object is brought to the selected state by the display control unit, the determination unit determines whether the predetermined condition concerning a cancellation of the selection of the object is satisfied based on the information about the eyes of the user, and when the predetermined condition concerning the cancellation of the selection of the object is determined to be satisfied, the display control unit brings the object in the selected to a non-selected state.

(32)

The information processing apparatus according to (31), wherein the determination unit determines that when a time in which the position of the line of sight indicated by the information about the eyes of the user is within a second region of the display screen is longer than a set second setting time or when the time in which the position of the line of sight indicated by the information about the eyes of the user is within the second region is equal to the second setting time or longer, the predetermined condition concerning the cancellation of the selection is satisfied and the second region is a region of the display screen where an object that is a selection candidate object as a target object that is able to be brought to the selected state and is different from the object in the selected state is displayed.

(33)

The information processing apparatus according to (32), wherein the determination unit dynamically sets the second setting time based on a magnitude of movement of the eyes of the user based on changes of the position of the line of sight indicated by the information about the eyes of the user and determines whether the predetermined condition concerning the cancellation of the selection is satisfied based on the second setting time set dynamically.

(34)

The information processing apparatus according to (32), wherein the determination unit determines whether the predetermined condition concerning the cancellation of the selection is satisfied based on the second setting time set in advance.

(35)

The information processing apparatus according to any one of (32) to (34), wherein when the position of the line of sight indicated by the information about the eyes of the user is within the second region, the display control unit stepwise changes a display mode of the object in the selected state in accordance with the time in which the position of the line of sight is within the second region.

(36)
The information processing apparatus according to any one of (32) to (35), wherein when the position of the line of sight indicated by the information about the eyes of the user is within the second region, the display control unit changes a display mode of the selection candidate object corresponding to the second region.

(37)
The information processing apparatus according to (31), wherein the information about the eyes of the user contains the information about a motion of the eyes of the user, and wherein the determination unit determines that the predetermined condition concerning the cancellation of the selection is satisfied when a predetermined motion of the eyes is detected based on the information about the motion of the eyes.

(38)
An information processing method executed by an information processing apparatus, the method including:
determining whether a predetermined condition concerning a selection of an object is satisfied based on information about eyes of a user, the information containing information about a position of a line of sight of the user on a display screen; and
when the predetermined condition concerning the selection is determined to be satisfied, bringing the object displayed in the position of the line of sight indicated by the information about the eyes of the user on the display screen to a selected state.

(39)
A program causing a computer to execute:
determining whether a predetermined condition concerning a selection of an object is satisfied based on information about eyes of a user, the information containing information about a position of a line of sight of the user on a display screen; and
when the predetermined condition concerning the selection is determined to be satisfied, bringing the object displayed in the position of the line of sight indicated by the information about the eyes of the user on the display screen to a selected state.

REFERENCE SIGNS LIST 100 information processing apparatus
102 communication unit
104 control unit
110 determination unit
112 display control unit

The invention claimed is:
1. An information processing apparatus, comprising:
a circuitry configured to:
control a display device to display at least one of a first region or a second region, wherein the first region includes a first selection candidate object, and wherein the second region excludes the first selection candidate object;
determine whether a first gaze duration of a gaze position of a user in the first region is longer than or equal to a first setting time duration;
change a display state of the first selection candidate object from a non-selected state to a selected state, based on the determination that the first gaze duration is longer than or equal to the first setting time duration;
determine whether a second gaze duration of the gaze position of the user in the second region is longer than or equal to a second setting time duration; and
change the display state of the first selection candidate object from the non-selected state to the selected state, based on the determination that the second gaze duration is longer than or equal to the second setting time duration.

2. The information processing apparatus according to claim 1,
wherein the circuitry is further configured to dynamically set the first setting time duration based on a magnitude of movement of eyes of the user, and
wherein the movement of the eyes of the user corresponds to changes of the (laze position towards which the user gazes.

3. The information processing apparatus according to claim 1,
wherein the first setting time duration is set in advance.

4. The information processing apparatus according to claim 1,
wherein the circuitry is further configured to:
determine whether a motion of eyes of the user comprises at least one of a blinking motion or a winking motion; and
change the display state of the first selection candidate object from the non-selected state to the selected state, based on the determination that the motion of the eyes comprises the at least one of the blinking motion or the winking motion.

5. The information processing apparatus according to claim 1, wherein the circuitry is further configured to:
control, based on the first selection candidate object that is in the non-selected state, the display device to display a moving object such that the moving object moves within the second region based on the gaze position; and
control, based on the first selection candidate object that is in the selected state, the display device to display the moving object such that the moving object is fixed on the first selection candidate object.

6. The information processing apparatus according to claim 5, wherein the circuitry is further configured to change a display mode of the moving object based on the change of the display state of the first selection candidate object from the non-selected state to the selected state.

7. The information processing apparatus according to claim 1, wherein in the selected state, the first selection candidate object corresponds to a static object.

8. The information processing apparatus according to claim 1, wherein the circuitry is further configured to:
dynamically set the second setting time duration based on a magnitude of movement of eyes of the user,
wherein the magnitude of the movement of the eyes of the user corresponds to changes of the glaze position.

9. The information processing apparatus according to claim 1,
wherein the second setting time duration is set in advance.

10. The information processing apparatus according to claim 1, wherein the circuitry is further configured to stepwise change a display mode of the first selection candidate object in the selected state, based on the gaze position that is within the second region.

11. The information processing apparatus according to claim 1, wherein the circuitry is further configured to:
change the display state of the first selection candidate object from the non-selected state to the selected state, based on determination that the daze position coincides with a display position of the first selection candidate object for at least the first setting time duration.

12. The information processing apparatus according to claim 1, wherein the second region includes a second selection candidate object different from the first selection candidate object.

13. The information processing apparatus according to claim 1,
wherein the circuitry is further configured to:
control the display device to fix a moving object to the first selection candidate object in the selected state; and
control, while the display state of the first selection candidate is changed from the selected state to the non-selected state, the display device to gradually separate the moving object from the first selection candidate object and move the moving object based on changes of the gaze position.

14. The information processing apparatus according to claim 13, wherein the moving object includes at least one of an icon, a cursor, a message box, or a notification object.

15. The information processing apparatus according to claim 1, further comprising the display device of a portable device.

16. An information processing method, comprising:
in an information processing apparatus:
controlling a display device to display at least one of a first region or a second region, wherein the first region includes a first selection candidate object, and wherein the second region excludes the first selection candidate object;
determining whether a first gaze duration of a gaze position of a user in the first region is longer than or equal to a first setting time duration;
changing a display state of the first selection candidate object from a non-selected state to a selected state, based on the determination that the first gaze duration is longer than or equal to the first setting time duration;
determining whether a second gaze duration of the gaze position of the user in the second region is longer than or equal to a second setting time duration; and
changing the display state of the first selection candidate object from the non-selected state to the selected state, based on the determination that the second gaze duration is longer than or equal to the second setting time duration.

17. A non-transitory computer-readable medium having stored thereon, computer-executable instruction for causing a computer to execute operations, the operations comprising:
controlling a display device to display at least one of a first region or a second region, wherein the first region includes a first selection candidate object, and wherein the second region excludes the first selection candidate object;
determining whether a first gaze duration of a gaze position of a user in the first region is longer than or equal to a first setting time duration;
changing a display state of the first selection candidate object from a non-selected state to a selected state, based on the determination that the first gaze duration is longer than or equal to the first setting time duration;
determining whether a second gaze duration of the gaze position of the user in the second region is longer than or equal to a second setting time duration; and
changing the display state of the first selection candidate object from the non-selected state to the selected state, based on the determination that the second gaze duration is longer than or equal to the second setting time duration.

* * * * *